United States Patent [19]
Saylor

[11] Patent Number: 6,025,595
[45] Date of Patent: Feb. 15, 2000

[54] SPRITE THERMAL IMAGING SYSTEM WITH ELECTRONIC ZOOM

[75] Inventor: Richard Saylor, Lake Hopatcong, N.J.

[73] Assignee: HE Holdings, Inc., Los Angeles, Calif.

[21] Appl. No.: 08/797,804

[22] Filed: Feb. 7, 1997

[51] Int. Cl.[7] .......................... H01L 27/146; H01L 31/00
[52] U.S. Cl. ...................... 250/334; 250/370.08
[58] Field of Search .............................. 250/338.1, 338.4, 250/332, 334, 347, 349

[56] References Cited

U.S. PATENT DOCUMENTS

| | | | |
|---|---|---|---|
| 4,482,807 | 11/1984 | Blackburn et al. | 250/334 |
| 4,800,277 | 1/1989 | Fremont | 250/334 |
| 4,801,802 | 1/1989 | Dyson | 250/332 X |
| 4,883,962 | 11/1989 | Elliot | 250/334 |

*Primary Examiner*—Edward J. Glick
*Attorney, Agent, or Firm*—W. C. Schubert; W. K. Denson-Low

[57] ABSTRACT

A signal processing in the element (SPRITE) thermal imaging system (20) is provided which has an electronic zoom. The system has an optics and scanning assembly (24) that scans energy from a scene (26) onto an array of SPRITE detectors (28) which generate a plurality of analog signals (30) that are proportional to the flux of infrared light received by each of the SPRITE detectors (28). The optics and scanning assembly (24) scans at a rate which is based on an optics and scanning assembly timing scheme and a digital scan converter (32) processes the analog signals (30) and generates a resultant digital output (34) for image production of the scene. The digital scan converter (32) processes the analog signals based upon a digital scan converter timing scheme. A timing and control unit (40) is used for controlling synchronization and alters the timing schemes to increase resolution and sensitivity.

19 Claims, 7 Drawing Sheets

SPRITE THERMAL IMAGING SYSTEM WITH ELECTRONIC ZOOM

BACKGROUND OF THE INVENTION

1. Field of the Invention

The present invention is directed to thermal imaging systems, and is more particularly directed to an electronic zoom for use in a Signal Processing in the Element (SPRITE) infrared imaging system.

2. Description of Related Art

Scanning thermal imaging systems are used in a variety of applications, including surveillance systems and target detection/recognition systems. Such systems typically incorporate a telescopic lens assembly coupled to a scanner. The scanner scans energy from a scene through an imager lens assembly onto a detector array having a plurality of photoelectrically responsive detector elements perpendicular to the scan direction. Each of these detector elements provides an electric signal proportional to the flux of infrared light on the particular detector element. Electric signals generated from the detector elements are subsequently processed by system sensor electronics to create an image for display on a system output device.

Resolution of an imaging system is influenced by the pixel size of the display Cathode Ray Tube (CRT) (i.e., spot size), and by the viewer's visual acuity. In order to increase resolution, zoom features are incorporated which allow an operator to realize the full resolution capability of the basic system. This enables the operator to detect targets at a greater range and to observe features that enable determination of target type.

Prior to the present invention, zoom capabilities were provided by optical configurations. However, for a high range of zoom ratio, the equipment necessary for an optical zoom becomes bulky and expensive. While electronic zoom configurations have been used in other imaging systems to extend the zoom range without incurring significant cost or size penalty, the electronic zoom has not been successfully implemented in a Signal Processing in the Element (SPRITE) detector based system. This is due to the difficulties imposed by the scanning technique of a SPRITE based system.

The difficulties of a SPRITE based system stem from the fact that a given line is not generated by the same SPRITE element on every field. Furthermore, the method of using an eight detector SPRITE configuration to obtain improved signal-to-noise performance, creates additional complications for use of an electronic zoom.

Therefore, it is the object of the present invention to provide a system and methodology for providing a zoom capability in a SPRITE infrared imaging system which addresses the above-described difficulties. The present invention establishes a novel sequence for reading data out of a scan converter to make an electronic zoom feasible as a separate mode of operation in a system which utilizes SPRITE detectors.

SUMMARY OF THE INVENTION

In accordance with the teachings of the present invention, a signal processing in the element (SPRITE) thermal imaging system is provided which has an electronic zoom capability for providing increased resolution of a scene and increased sensitivity. The system has an optics and scanning assembly that scans energy from the scene onto an array of SPRITE detectors which generate a plurality of analog signals that are proportional to the flux of infrared light received by each of the detectors. The optics and scanning assembly scans at a rate which is based on an optics and scanning assembly timing scheme. A digital scan converter processes the analog signals and generates a resultant output which contains digital image data for image production of the scene. The digital scan converter processes the analog signals based upon a digital scan converter timing scheme. A timing and control unit is used for controlling synchronization of the system, with the timing and control unit altering the optics and scanning assembly timing scheme and the digital converter timing scheme in order to produce an image of the scene with increased resolution and increased sensitivity.

BRIEF DESCRIPTION OF THE DRAWINGS

Other objects and advantages of the invention will become apparent upon reading the following detailed description and upon reference to the following drawings, in which.

DESCRIPTION OF THE PREFERRED EMBODIMENTS

The following description of the preferred embodiments is merely exemplary in nature and is in no way intended to limit the invention or its application or uses.

Figure 1:
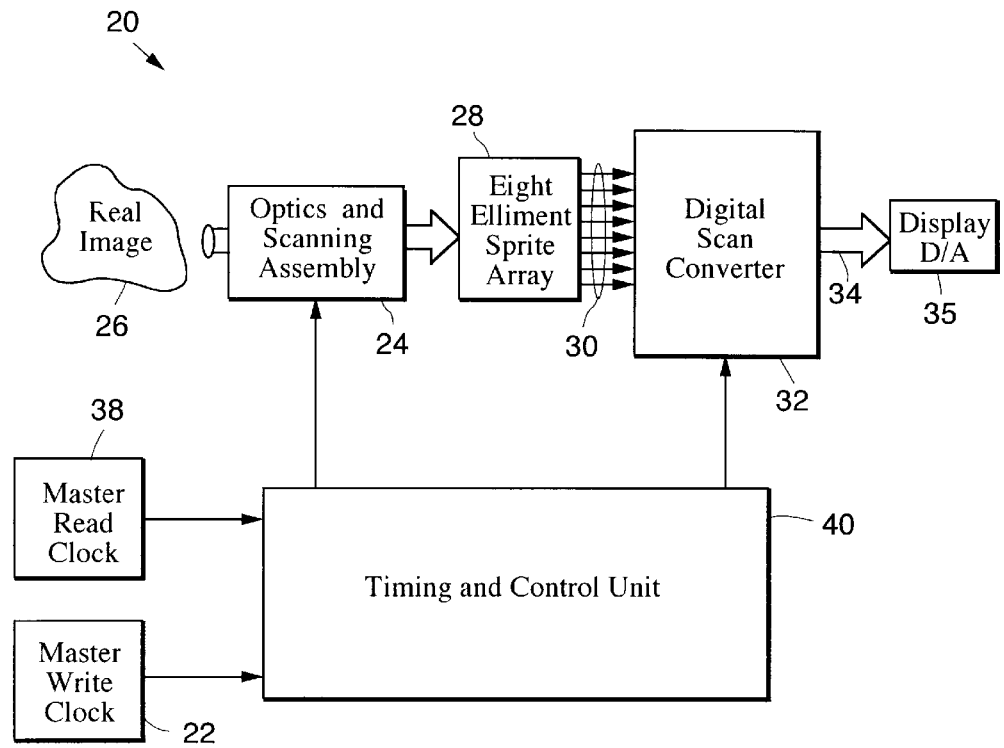
FIG. 1 is a block diagram of the basic components of a signal processing in the element infrared imaging system having the electronic zoom of the preferred embodiment of the present invention.

FIG. 1 shows a block diagram of the basic components of an infrared imaging system 20 having the electronic zoom of the preferred embodiment of the present invention. The zoom capability is included in an infrared imaging system 20 which utilizes a Signal Processing in the Element (SPRITE) array 28 composed of eight SPRITE detectors with a scanning technique arranged for series-parallel scanning to generate an infrared image.

This system 20 operation entails the optics and scanning assembly 24 scanning energy from a scene 26 onto the SPRITE array 28. Each of the individual detectors that comprise the SPRITE array 28 provide an analog signal which is proportional to the flux of infrared light on the particular detector element. These analog signals 30 are then provided to a digital scan converter 32 which processes the individual signals received, ultimately generating a resultant output 34 which contains digital image data. This resultant output 34 is subsequently converted to analog by a display digital-to-analog (D/A) converter 36 for image production on a CRT (not shown).

The system 20 uses a master read clock 38 and master write clock 22 from which all scanning and display synchronization is obtained. This includes synchronization with horizontal and vertical scanning, which is provided by the optics and scanning assembly 24, and elements of the digital scan converter 32. The clock synchronization scheme for proper operation is provided by the timing and control unit 40 which is composed primarily of programmable gate arrays (PGA). Because the system synchronization is accomplished with the PGAs of the timing and control unit 40, and because of the nature of the digital scan converter 32, the zoom may be incorporated without a significant increase in size, weight, or cost.

The zoom feature of the present invention takes advantage of the fact that the digital scan converter 32 is basically a memory device (using first-in/first-out (FIFO) memory devices). A line of data is written to these memory devices and then stored for a period of time before being read out at a frequency which is different than the frequency used to write the data. By reading the data at a rate that is slower than normal (i.e., no zoom), the time between pixels is increased. Since the scan rate of the display monitor is unchanged, the space between display pixels is increased, thereby providing horizonal magnification.

Vertical magnification also takes advantage of the memory characteristics of the scan converter, but in a different manner. Vertical zoom is achieved, to begin with, by reducing the scan rate of the vertical scanner of the optics and scanning assembly 24. As a result, a smaller vertical region of space is scanned in the time of one field (⅙₀th of a second). On the display, since the vertical scan rate is unchanged, the smaller vertical area is stretched over the full screen height which creates magnification in the vertical direction. However, as previously indicated, the difficulty lies in presenting the lines in the proper sequence, which is subsequently described in detail.

Figure 2:
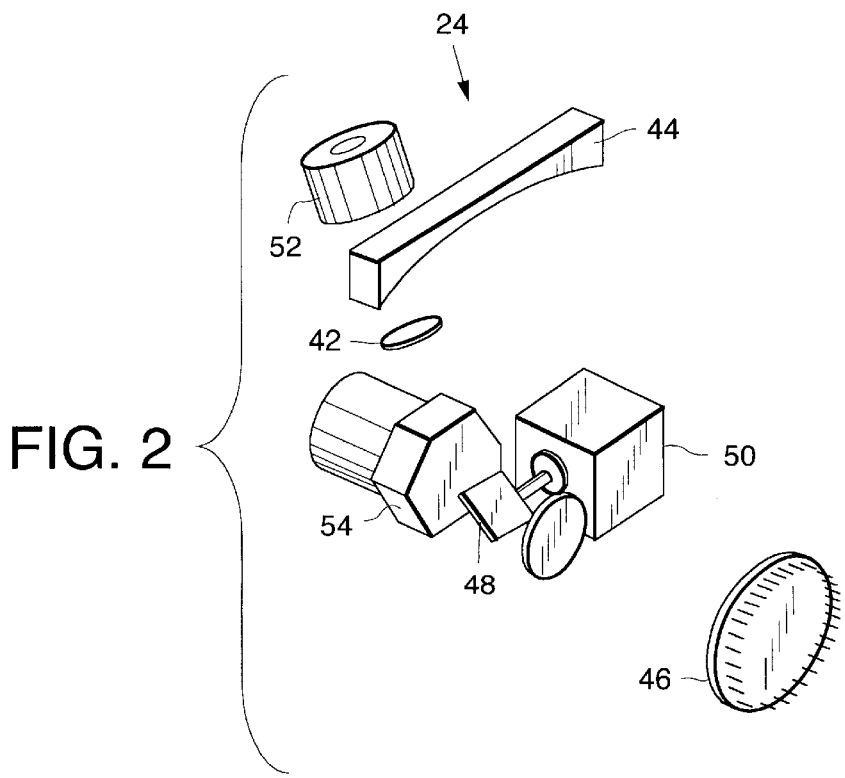
FIG. 2 is a simplified schematic of the optics and scanning assembly of the signal processing in the element infrared imaging system.

In order to describe the incorporation of the electronic zoom of the present invention, it is necessary to present additional details of the imager system 20. FIG. 2 shows a simplified schematic of the optics and scanning assembly 24 which scans energy from a scene onto the SPRITE array. The basic operation of the optics and scanning assembly 24 consists of a relay lens 42 receiving a real image as provided through a detector port 52. The relay lens 42 transmits the real image to a horizontal scanning mirror 54, which is a rotating polygon. As the scanning mirror 54 rotates, the real image moves in the focal plane of a spherical mirror 44, with each point on the mirror surface corresponding to a varying azimuthal angle beam in space. These beams are then reflected onto the SPRITE array 46 with the vertical scan mirror 48, which is driven by the vertical galvanometer 50.

Figure 3:
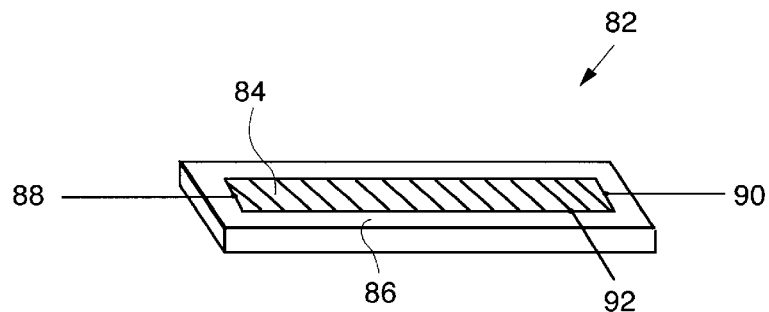
FIG. 3 is a perspective view of the structure of an individual signal processing in the element detector.

FIG. 3 illustrates the structure of a SPRITE detector 82 which makes up the SPRITE array. The detector 82 is constructed of a photoconductive Mercury Cadmium Telluride (HgCdTd) strip 84 embedded in a sapphire substrate frame 86. The strip 84 has a first bias contact 88 located at one end, and a second bias contact 90 located at the end opposite the first bias contact 88. A bias voltage is applied to the contacts (88,90) which causes the excess carriers to drift towards a readout electrode 92 in the vicinity of second bias contact 90. With a drift velocity matching the rate at which an image is scanned across the strip 84, an effective time delay and integration (TDI) is produced.

Figure 4:
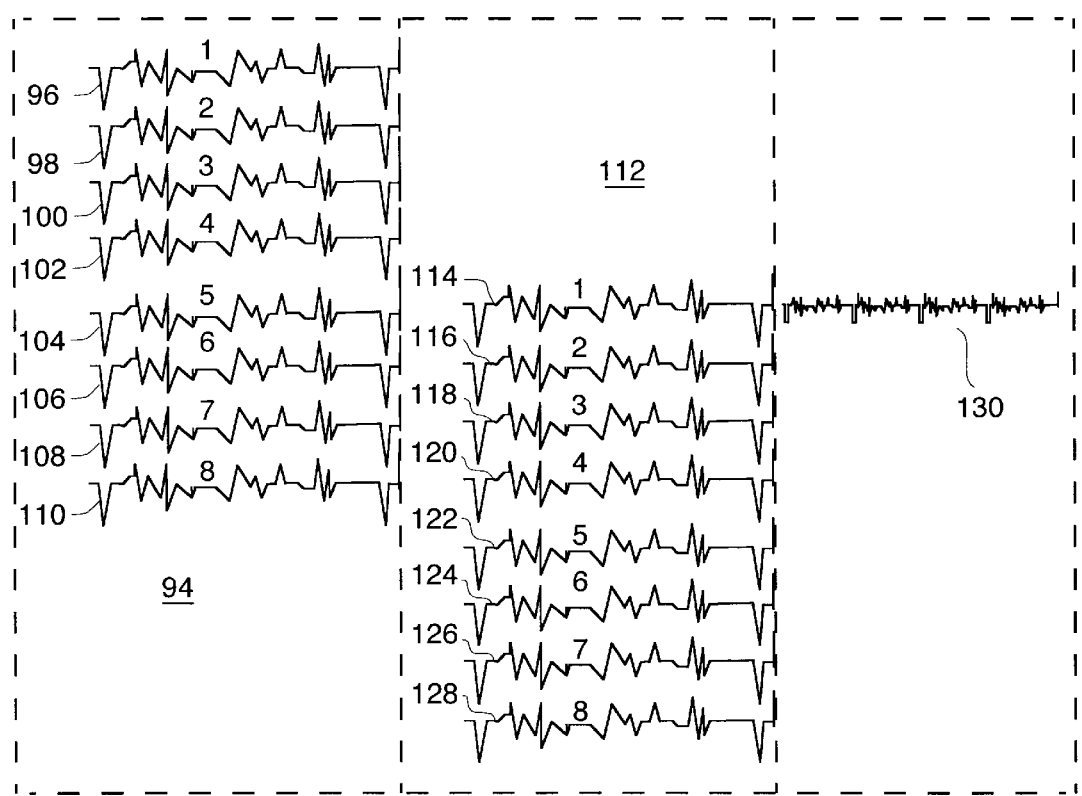
FIG. 4 is an illustration of the signal processing in the element analog output during normal operation.

FIG. 4 illustrates the analog output for an array of eight SPRITE detectors. This figure illustrates the method of operation without the zoom capability enabled. As can be seen, one horizontal scan of the SPRITE array produces a first swath 94 of eight lines (96, 98, 100, 102, 104, 106, 108, 110). During a subsequent horizontal scan, a second swath 112 of eight lines (114, 116, 118, 120, 122, 124, 126, 128) is generated which is displaced from the first swath 94 by four. Therefore, during the second scan, the first four elements of the SPRITE array generate the same image as the second four elements of the SPRITE array, respectively.

The data corresponding to the first four elements of the most recent scan (represented by second swath 112 lines (114, 116, 118, 120)) are added to the data corresponding to the second four elements of the previous scan (represented by first swath 94 lines (104, 106, 108, 110)). This produces a resultant signal 130 which is double the signal received by an individual SPRITE detector; however, since the noise from each of the eight elements is un-correlated, the noise only increases by the square root of two. Therefore, the signal-to-noise ratio is improved by a factor of 1.41.

Figure 5:
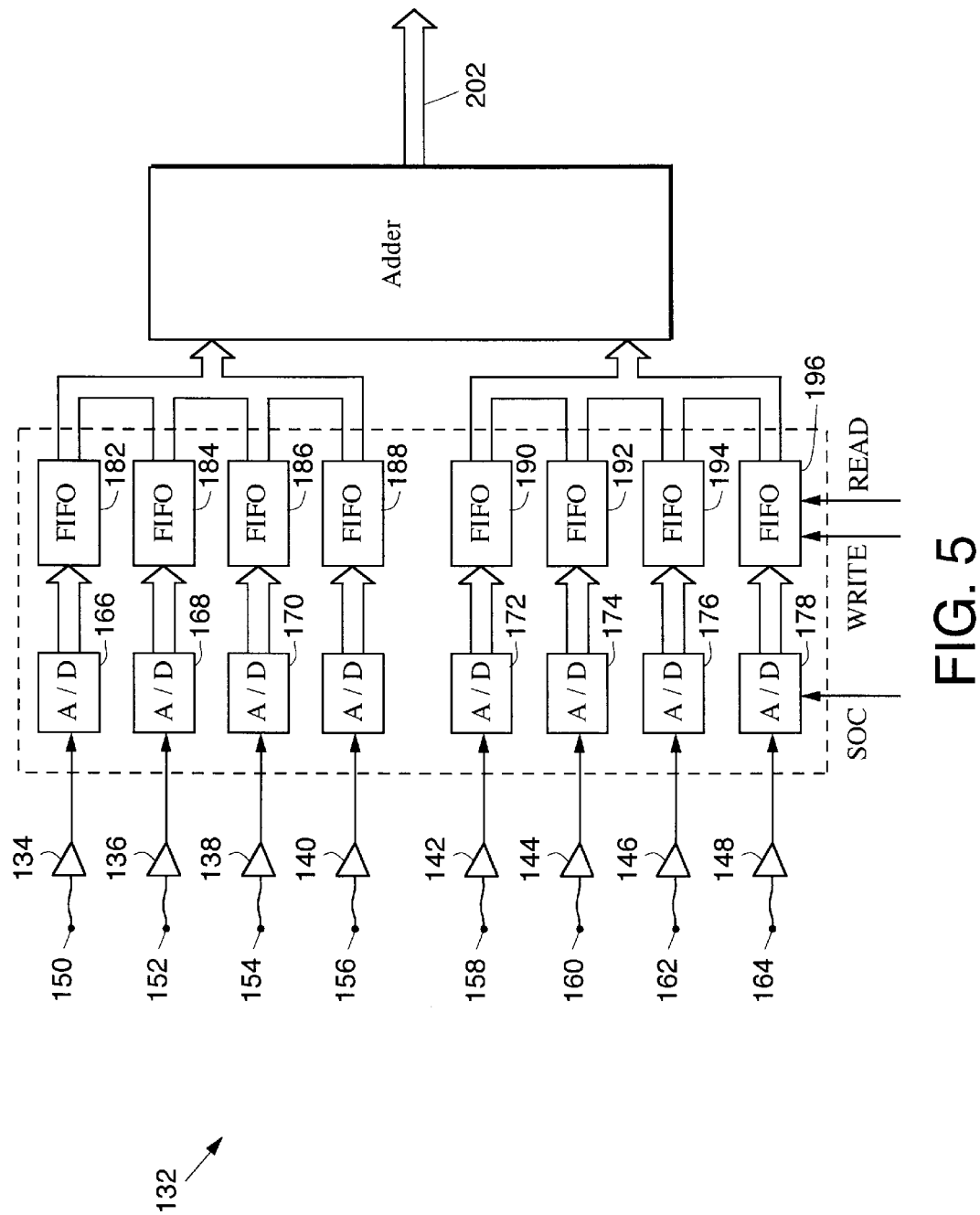
FIG. 5 is a schematic of the digital scan converter of the signal processing in the element infrared imaging system.

The addition of the first four elements of the most recent scan to the data corresponding to the second four elements of the previous scan is accomplished in the digital scan converter 132, as shown in FIG. 5. This converter 132 performs the operations necessary to generate the resultant output which is provided to the display D/A and ultimately to the CRT.

The digital scan converter 132 is comprised of eight amplifiers (134, 136, 138, 140, 142, 144, 146, 148) corresponding to each of the SPRITE detector channels (150, 152, 154, 156, 158, 160, 162, 164), eight A/D converters (166, 168, 170, 172, 174, 176, 178, 180) for converting each amplified signal to digital form, eight first-in/first-out (FIFO) memory devices (182, 184, 186, 188, 190, 192, 194, 196) to store the pixel data, and an adder 198.

The FIFO memory devices (182, 184, 186, 188, 190, 192, 194, 196) are 4K by 8, single chip FIFOs. Each line from the A/D converters (166, 168, 170, 172, 174, 176, 178, 180) consists of 1040 samples; therefore, storage capability is more than adequate to store two lines plus a part of a third line as the worst case requires. The FIFOs read and write simultaneously and at different frequencies to provide single eight-bit buses that contain serial pixel data. This serial pixel data from the first four SPRITE detectors (150, 152, 154, 156) are then summed by the adder 198 to the serial pixel data corresponding to the second four SPRITE channels (158, 160, 162, 164) of the previous scan. The resultant output 202 containing the image data received is then provided to the display D/A for image generation.

Figure 6:
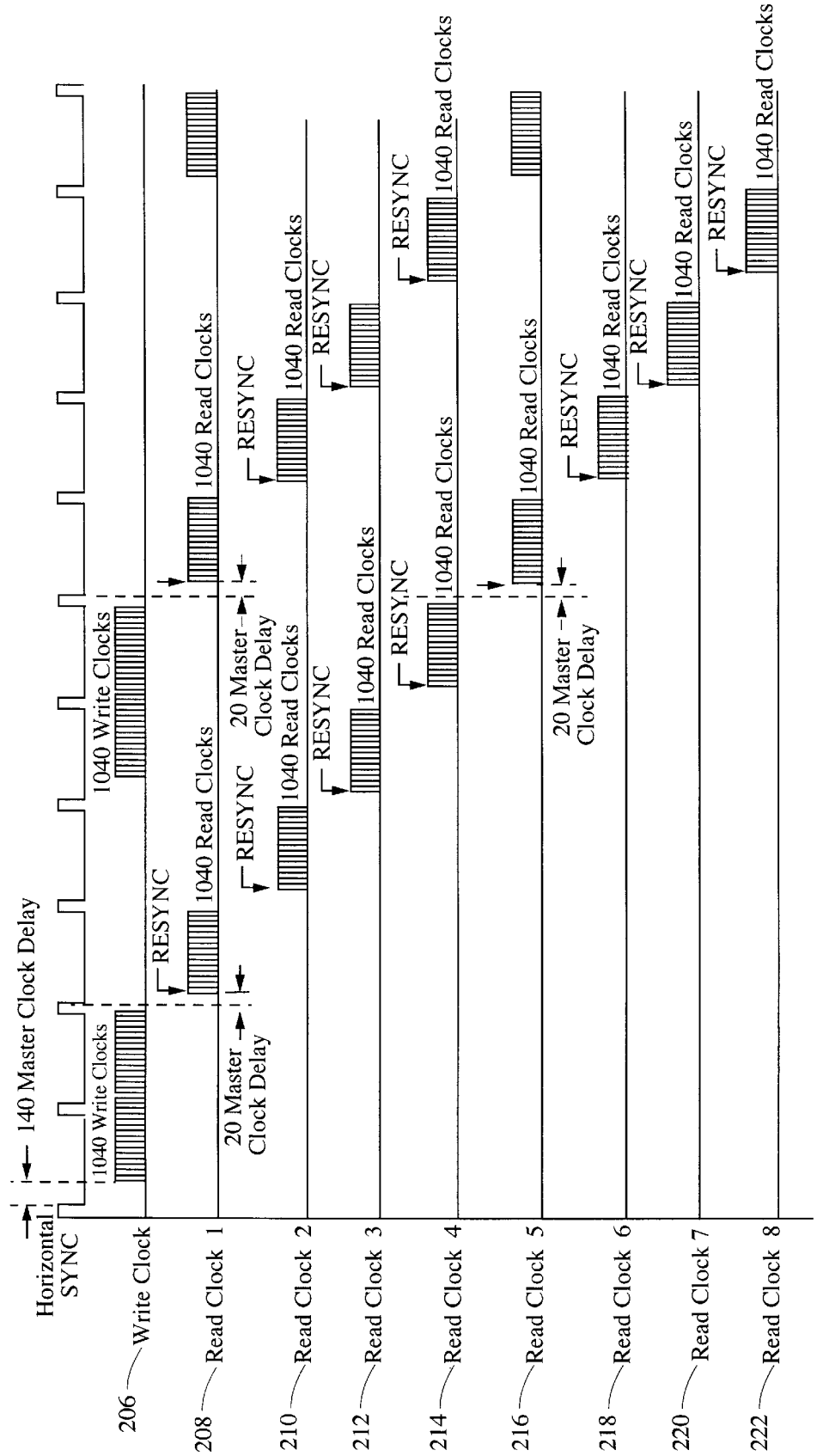
FIG. 6 is a timing diagram showing the timing scheme used by the signal processing in the element imaging system during normal operation.

As previously indicated, the timing and control unit provides the timing scheme to enable normal operation of the imaging system as previously described. FIG. 6 demonstrates the timing scheme provided by the timing and control unit during normal operation. As can be seen, during normal operation the timing and control unit causes all FIFOs to be written at the same time (as indicated by the write clock pulse 206). However, the output data from each of the FIFOs is delayed by varying amounts (as indicated by the read pulses (208, 210, 212, 214, 216, 218, 220, 222). As shown, the most recent scan data corresponding to channels five through eight are produced by their corresponding FIFOs at the same time as scan channel data of a previous scan and corresponding to channels one through four. This allows the adder to sum this data and produce the resultant output as previously described in conjunction with FIG. 4.

When the user of the imaging system desires the apparatus to zoom in on a portion of a scene, the timing control unit alters the normal mode timing scheme. This includes altering the timing presented to the FIFOs and the vertical scan mirror, such as decreasing the span and velocity of the vertical scan mirror by a factor of two (as shown in FIG. 2) and reducing the frequency of the FIFO read pulses by a factor of two.

With the vertical scan rate reduced by a factor of two, sensitivity is doubled. This is due to the increased time that each detector views a portion of the scene. Therefore, the detector receives twice the view of an image and consequently the output signal amplitude is doubled. This combined effect of improved resolution and improved sensitivity greatly enhances the target detection capability of the system.

Figure 7:
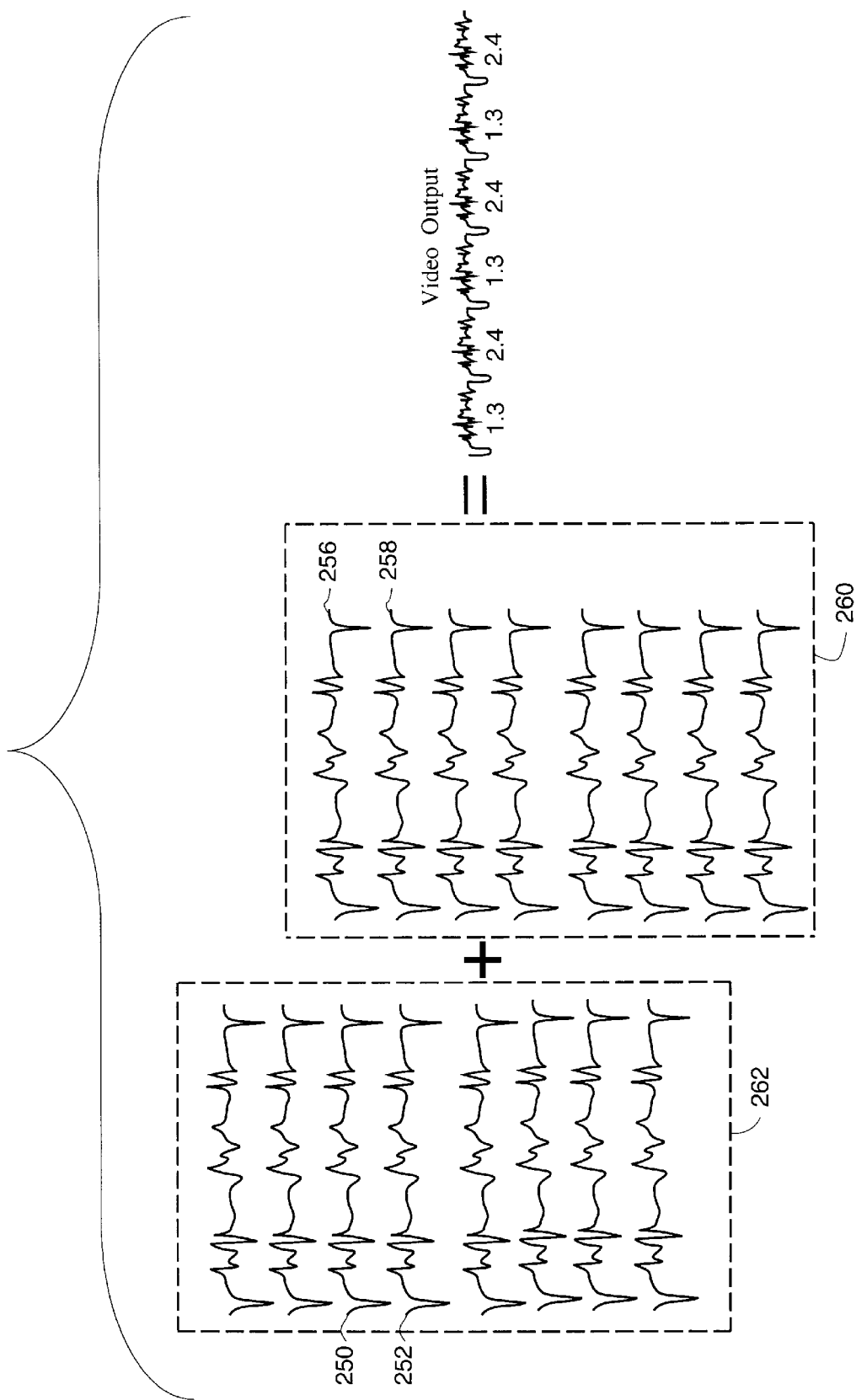
FIG. 7 is a waveform diagram illustrating the signal processing in the element analog output when the imaging system is in a zoom mode.

FIG. 7 illustrates the analog signals produced by the SPRITE detectors with the vertical scan velocity reduced by two. As illustrated, a subsequent scan 260 is offset by two lines from the previous scan 262, rather than four lines as was the case during the normal mode. The signals corresponding to detectors three 250 and four 252 of the previous scan 262 provide the same image signal as detectors one 256 and two 258 of the subsequent scan 260. Therefore, in addition to modifying the vertical scan mirror velocity, it is necessary to modify the control circuits that provide the gated clocks to the FIFOs during the zoom mode.

Figure 8:
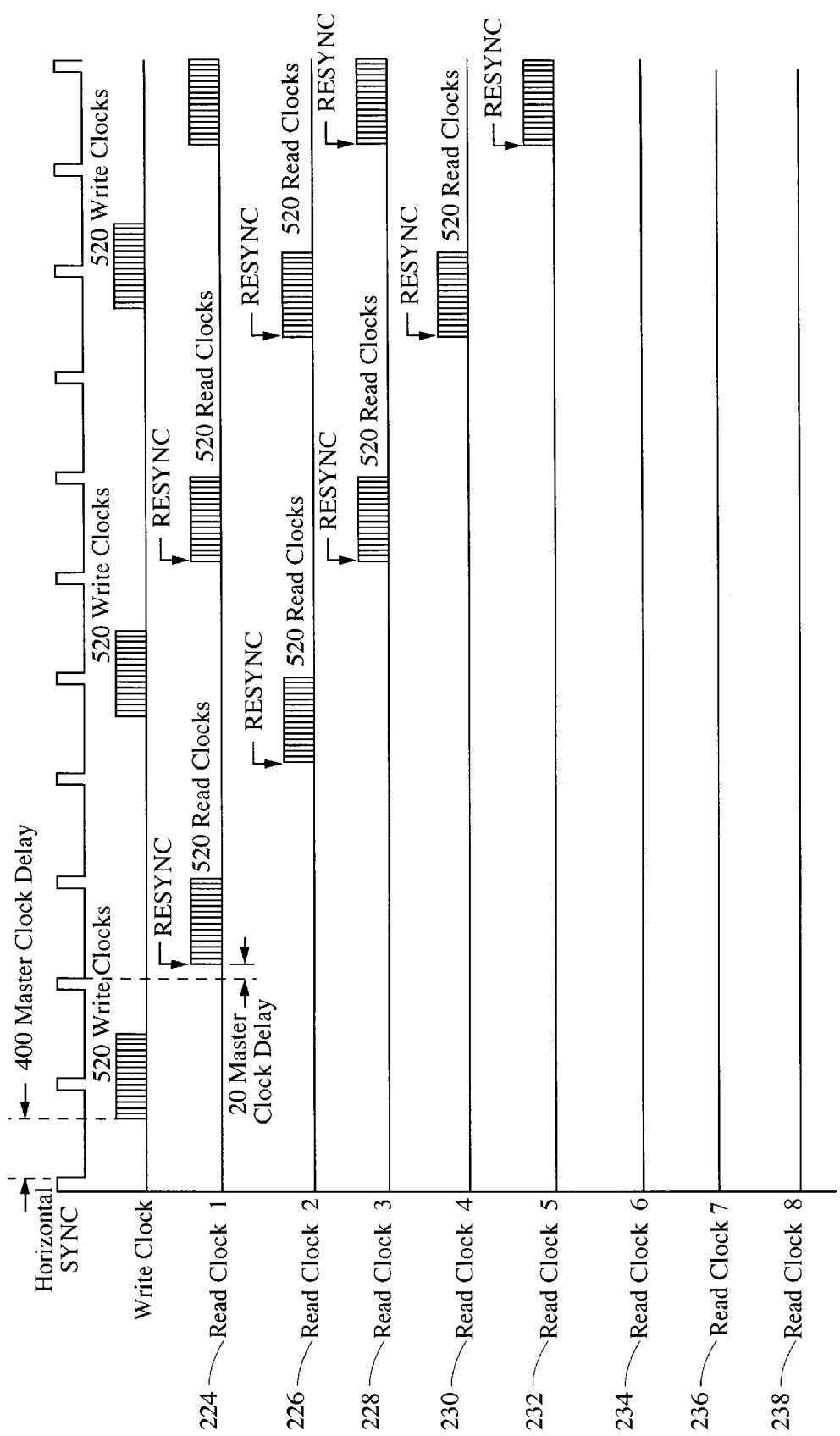
FIG. 8 is a timing diagram showing the timing scheme used to provide the zoom capability.
Figure 9:
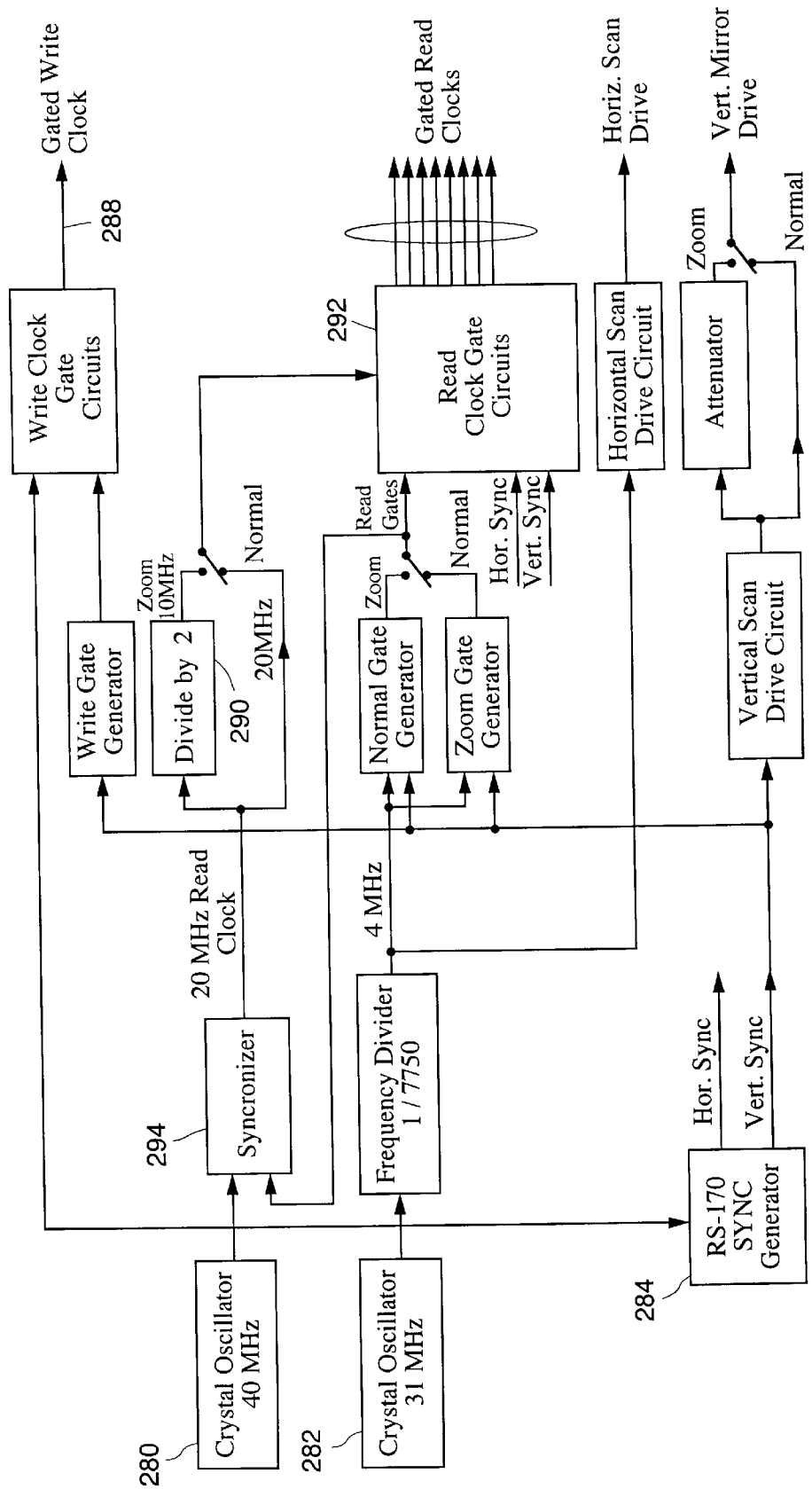
FIG. 9 is a schematic of the timing and control unit in further detail.

FIG. 8 shows the zoom mode timing scheme as presented by the timing and control unit to the FIFOs. The scheme entails reducing the read pulses (224, 226, 228, 230, 232, 234, 236, 238) such that the proper channel data is added, thereby producing the desired resultant scan, as shown in FIG. 7. For example, channels one, two, three, four, five and six of the current scan are added to three, four, five, six, seven and eight channel data from the previous scan. As was mentioned and demonstrated, the zoom feature is accomplished with very little added hardware. Most of the zoom functions are achieved through the modification of timing parameters, most of which is accomplished with FPGAs of the timing and control unit. FIG. 9 shows the timing and control unit in further detail.

Two crystal oscillators generate the master clocks, a 40 Mhz crystal oscillator 280 and a 31 Mhz crystal oscillator 282. The 31 Mhz oscillator 282 is provided to the RS-170 sync generator for display functions and to drive the horizontal and vertical scanner mirrors. Furthermore, it is used to generate the gated write clock 288 for the FIFOs of the scan converter.

The 40 Mhz clock 280 is used solely for the scan converter read clocks. The 40 Mhz clock 280 is divided by two and then gated individually by the read clock gate circuit 292 to provide the gated read clock needed by the scan converter FIFOs to generate the waveforms shown in FIGS. 6 and 8. The sequences shown in these figures apply to the start of each vertical field. FIGS. 6 and 8 show the initial delays of the clock bursts that are essential for the summation process that occurs at the output of the scan converter. These initial delays establish the sequence that follows for the remainder of each field.

There is a special problem for the read clock that results from the use of two master clocks. It is necessary that the gates for the read clock be derived from the 31 Mhz clock 282, SO that the lines of displayed data are locked in position relative to the display frame, which in turn is determined by the horizontal sync pulse from the sync generator 284.

A 20 MHz read clock is needed so that the 1040 pixels of one scan line fit in the unblanked region of the display line. Since the two clocks are asynchronous, the time from the start of a read gate to the next 20 Mhz clock is random. This randomness could cause a one-clock jitter of the displayed data. In other words, a vertical line would appear jagged or zippered by an amount equivalent to one clock period.

The synchronizer 294 is used to minimize this effect. The synchronizer 294 waits for the start of a read gate, then looks for the next rising edge of the 40 Mhz clock. The synchronizer 294 then controls the divide-by-two 290 (that provides the read clock) so that the rising edge of the read clock coincides with the rising edge of the first 40 Mhz clock that occurred following the start of the gate. This process of synchronization occurs on every line. The effect is to reduce any jitter to ½ of a pixel width which is acceptable.

The thermal imaging system as presented describes a system and methodology for providing an electronic zoom for use in a system which utilizes signal processing in the element detectors. This system will allow an operator to detect targets at a greater range and to observe features that enable determination of target type. This system is based upon a configuration which allows zoom implementation without incurring significant cost or size penalty.

Various other advantages of the present invention will become apparent to those skilled in the art after having the benefit of studying the foregoing text and drawings, taken in conjunction with the following claims.

What is claimed is:

1. A signal processing in the element thermal imaging system (SPRITE) having an electronic zoom capability for providing increased resolution of a scene and increased sensitivity, comprising:

an optics and scanning assembly for scanning energy from said scene onto an array of SPRITE detectors which generate a plurality of analog signals that are proportional to the flux of infrared light received by each of said detectors, said optics and scanning assembly having scan rates which are based on an optics and scanning assembly timing scheme;

a digital scan converter for processing said analog signals and generating a resultant digital output which contains digital image data for image production of said scene, said digital scan converter processing said analog signals based upon a digital scan converter timing scheme; and a timing and control unit for controlling synchronization of said system, said timing and control unit altering said optics and scanning assembly timing scheme and said digital scan converter timing scheme to produce increased sensitivity and an image of said scene with increased resolution.

2. The system of claim 1 wherein said SPRITE detectors are constructed of a photoconductive mercury cadmium telluride (HgCdTd) strip embedded in a sapphire substrate frame, said strip having a first bias contact located at a first end and a second bias contact located at a second end which is opposite said first end.

3. The system of claim 1 wherein said digital scan converter has a plurality of first-in/first-out (FIFO) memory devices for reading and writing simultaneously and at different frequencies to provide a plurality of multi-bit buses that contain serial pixel data, said FIFO memory devices reading and writing data based upon said digital scan converter timing scheme.

4. The system of claim 3 wherein said optics and scanning assembly has a vertical scan mirror that operates at a vertical scan velocity which is based upon said optics and scanning assembly timing scheme.

5. The system of claim 4 wherein said increased resolution of said system is achieved by reducing said scan velocity of said vertical scan mirror by a given factor and reducing said FIFO memory device reading frequency.

6. The system of claim 3 wherein said serial pixel data is transmitted to an adder that conducts a summation process with the result being said resultant digital output.

7. The system of claim 3 wherein each of said first-in/first-out memory devices is a 4 K by 8 single chip first-in/first-out memory device.

8. The system of claim 1 wherein said digital scan converter has a plurality of digital-to-analog converters for converting said analog signals into digital form.

9. The system of claim 1 wherein said digital scan converter has a plurality of amplifiers for amplifying said analog signals.

10. The system of claim 1 wherein said array of SPRITE detectors is an array of eight SPRITE detectors.

11. A method of providing increased resolution and sensitivity in a signal processing in the element (SPRITE) thermal imaging system, comprising the steps of:

scanning scene energy with an optics and scanning assembly onto an array of SPRITE detectors in order to generate a plurality of analog signals that are proportional to the flux of infrared light received by each of said detectors, said scanning scene energy performed at a rate which is based on an optics and scanning assembly timing scheme;

processing said analog signals with a digital scan converter and generating a resultant digital output which contains digital image data for image production of a scene, said scan converter processing said analog signals and generating said digital output based upon a digital scan converter timing scheme; and altering said optics and scanning assembly timing scheme and said digital converter timing scheme with a timing and control unit whereby resolution and sensitivity are increased in said system.

12. The method of claim 11 wherein said step of scanning scene energy includes operating a vertical scan mirror at a vertical scan velocity which is based upon said optics and scanning assembly timing scheme.

13. The method of claim 12 wherein said step of processing said analog signals includes reading and writing data representing said analog signals with a plurality of FIFO memory devices, said reading and writing conducted at intervals based upon said digital scanning assembly timing scheme.

14. The method of claim 13 wherein said step of altering said optics and scanning assembly timing scheme and said digital scanning assembly timing scheme consists of reducing said scan velocity of said vertical scan mirror and reducing said intervals between each read of said plurality of FIFO memory devices.

15. The method of claim 11 wherein said step of processing said analog signals includes conducting a summation process with the result being said resultant digital output.

16. The method of claim 11 wherein said step of processing said analog signals includes amplifying said analog signals in order to produce a plurality of amplified analog signals.

17. The method of claim 16 wherein said step of processing said analog signals includes converting said amplified analog signals into digital form with a plurality of digital-to-analog converters.

18. The method of claim 11 wherein said array of SPRITE detectors is an array of eight SPRITE detectors.

19. The method of claim 11, further comprising the step of applying a bias voltage across each of said SPRITE detectors.

* * * * *